UNITED STATES PATENT OFFICE.

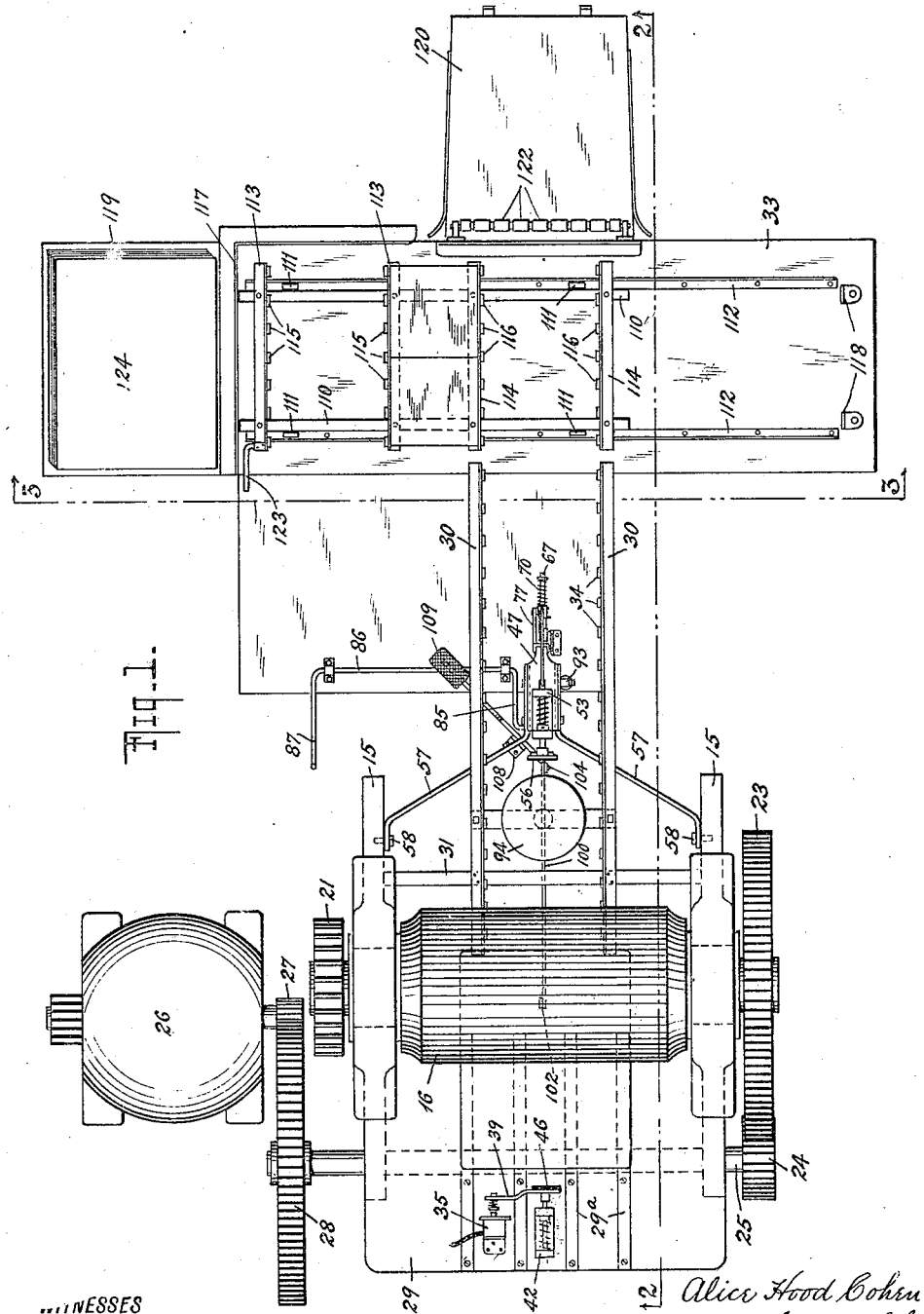

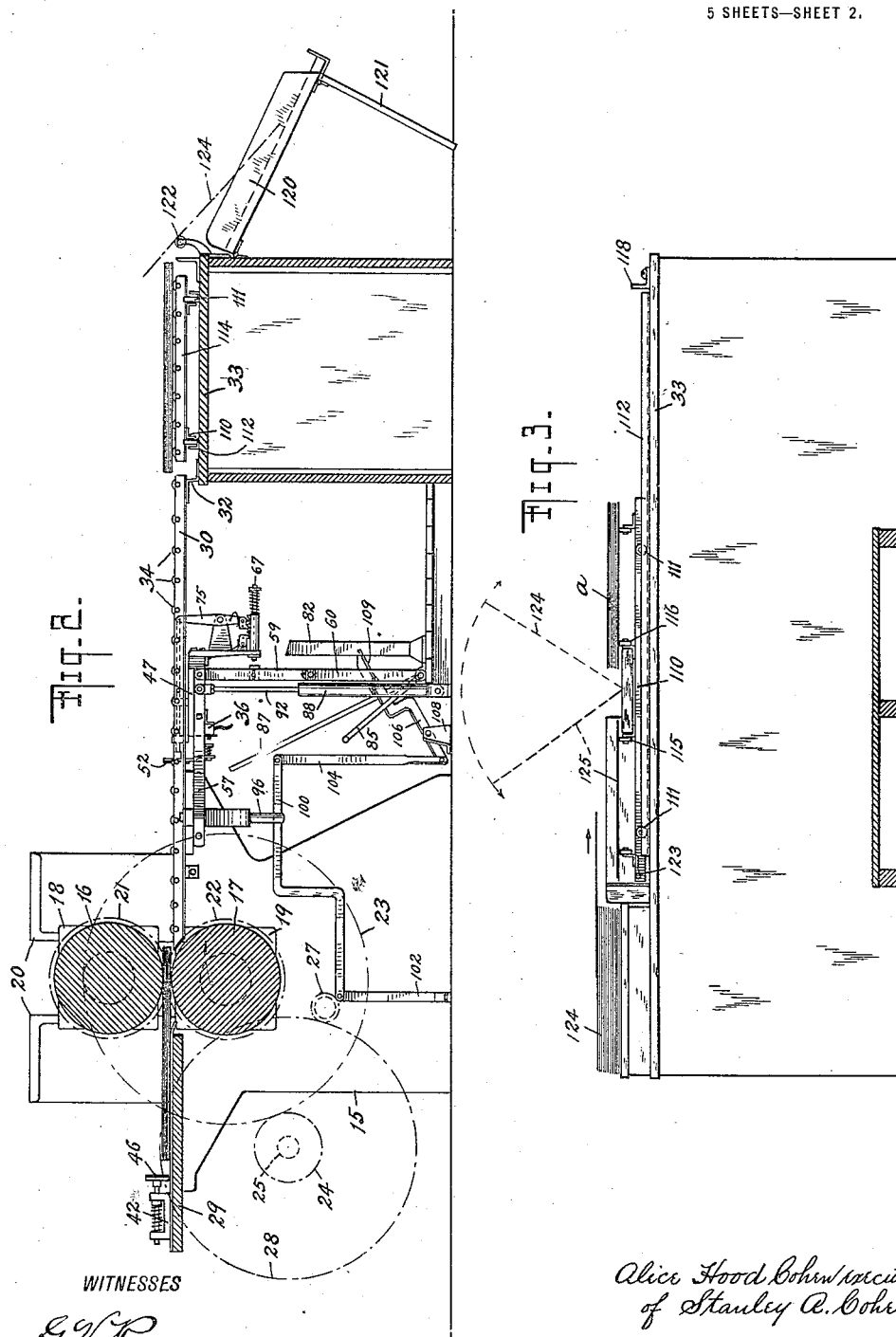

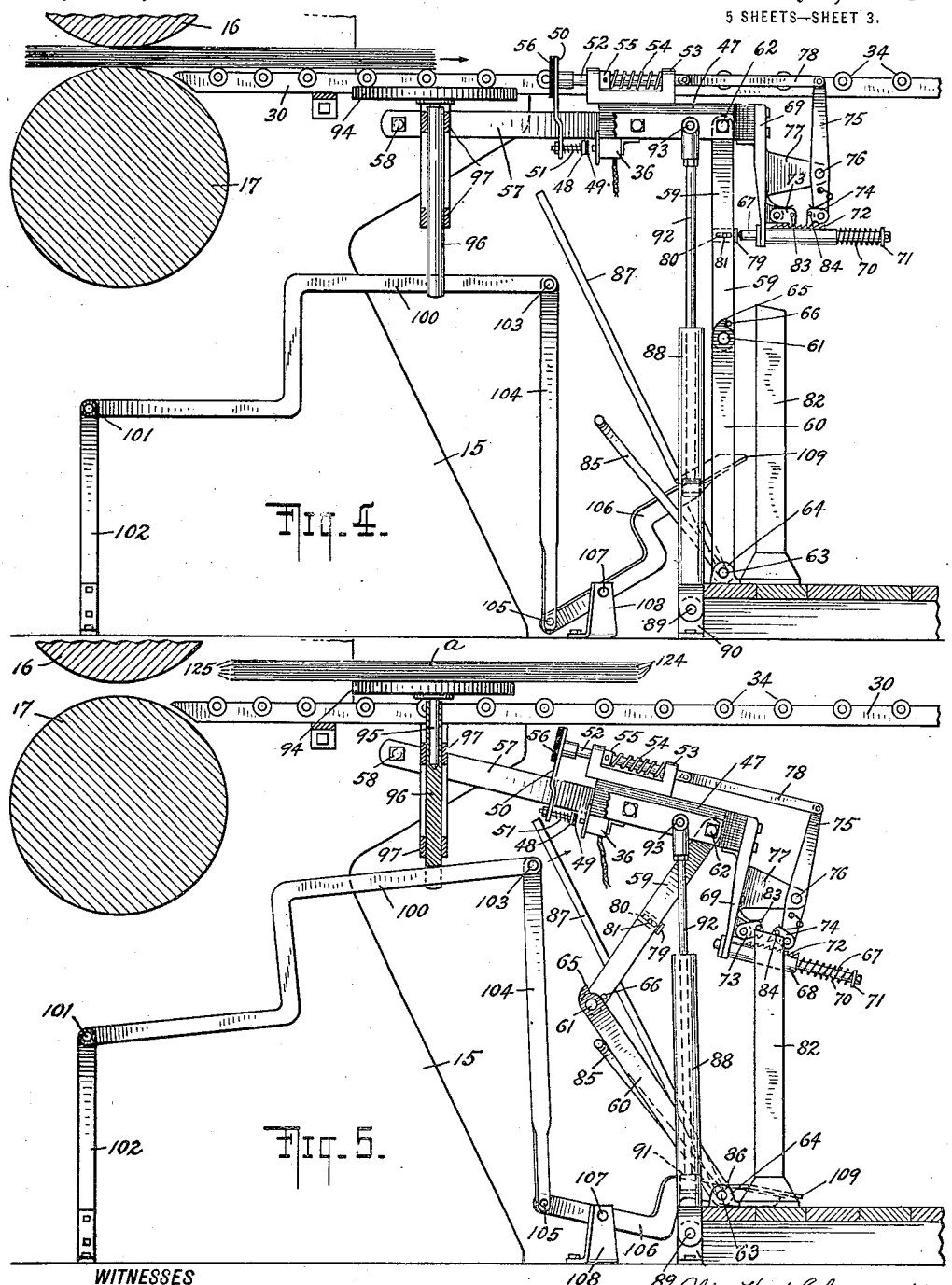

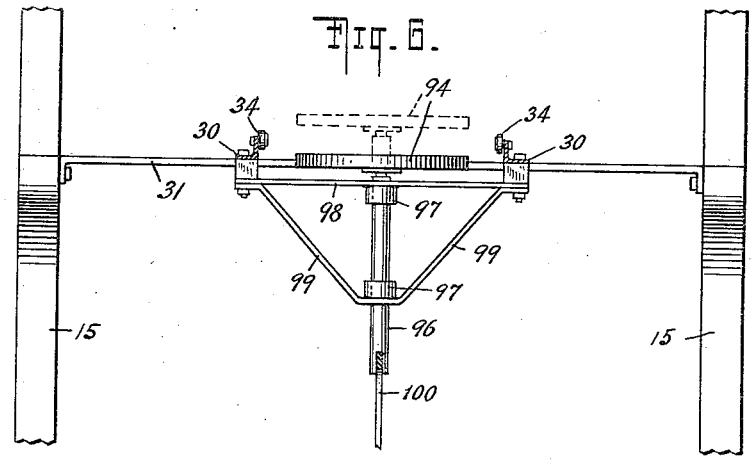
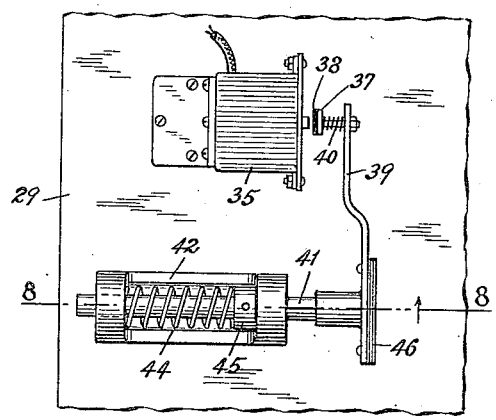
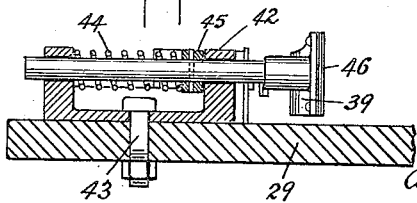

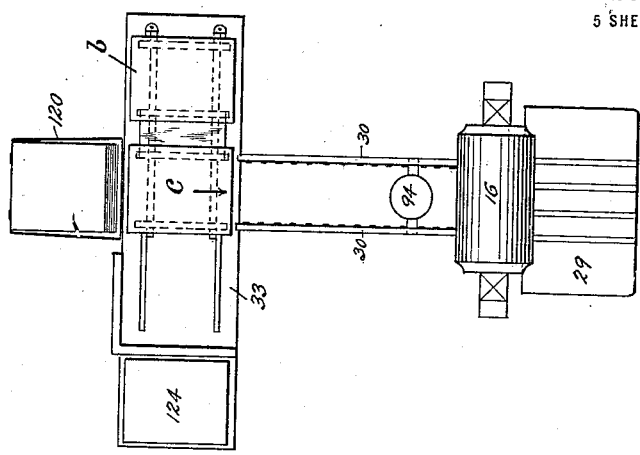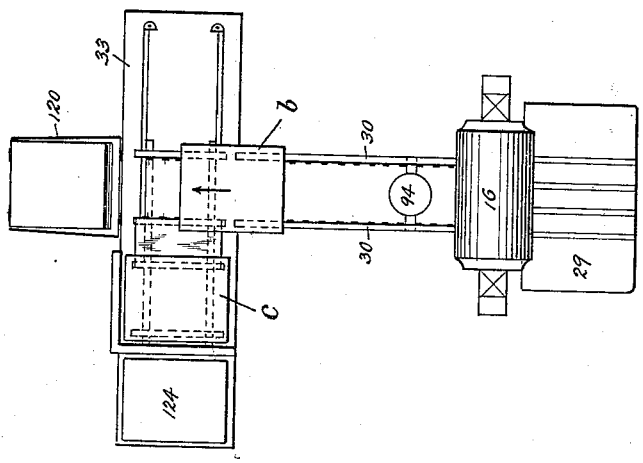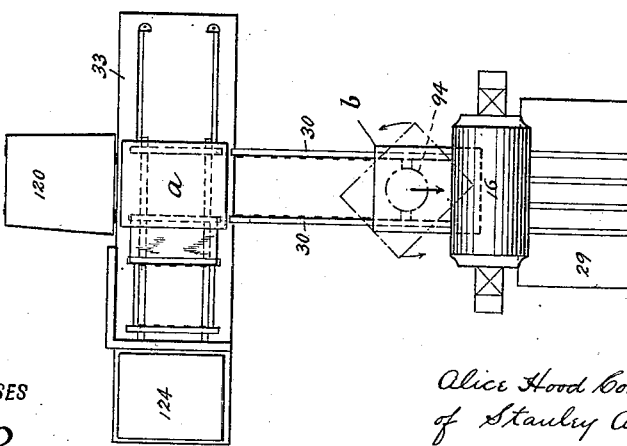

STANLEY A. COHEN, DECEASED, LATE OF NEW YORK, N. Y., BY ALICE HOOD COHEN, EXECUTRIX, OF NEW YORK, N. Y., ASSIGNOR TO THE NEW YORK CONSOLIDATED CARD COMPANY, OF LONG ISLAND CITY, NEW YORK, A CORPORATION OF NEW YORK.

PLATING MACHINE.

1,421,912.   Specification of Letters Patent.   Patented July 4, 1922.

Application filed May 17, 1920. Serial No. 382,022.

*To all whom it may concern:*

Be it known that STANLEY A. COHEN, deceased, late a citizen of the United States, and a resident of New York, borough of Manhattan, city and State of New York, invented a certain new and useful Improvement in Plating Machines, of which the following is a specification.

The invention relates to plating machines for calendering paper and more particularly to that type of such machines whereby the desired finish is imparted to playing cards.

In machines of the indicated type it is customary to compact playing cards between pressing rolls, a plurality of sheets of a size from which the fifty-four cards of a pack may be cut and properly printed being arranged in a pile with metal sheets alternating therebetween and passed back and forth between said rolls a predetermined number of times. Heretofore the reversal of the travel of the pile has been manually controlled, the same being true of the number of backward and forward movements of said pile, thus requiring the careful and continuous attention of an operator in order to secure the desired results.

The particular purpose of the present invention is to provide a construction in which this manual control is replaced by automatic means whereby the reversal of the travel of the pile and its number of backward and forward movements between the rolls will be accurately and efficiently controlled automatically.

In addition the invention contemplates the provision of a simple carrier whereby the building up of the piles and the handling thereof is facilitated and whereby the efficiency of the apparatus and its economy of operation is increased to a maximum extent.

The invention will be fully described hereinafter and the features of novelty will be pointed out in the appended claims.

In the accompanying drawing, which for illustrative and descriptive purposes show an example of the invention without defining its limits, Fig. 1 is a plan view of the machine; Fig. 2 is a sectional elevation on the line 2—2 of Fig. 1; Fig. 3 is an end view; Figs. 4 and 5 are detail views on an enlarged scale showing the parts in different positions; Fig. 6 is a detail elevation of a lifting device forming part of the invention; Fig. 7 is a detail plan view of the reversing means; Fig. 8 is a sectional view on the line 8—8 of Fig. 7; and Figs. 9, 10 and 11 are diagrammatic views illustrating the carrier and its operation.

In the illustrated example the machine comprises a frame 15 of suitable construction and dimensions and provided with pressing rolls 16 and 17 of customary form. These rolls may be rotatably mounted one above the other in any well known way as for instance by being journalled respectively in blocks 18 and 19 vertically slidable in upright guideways 20 included as a part of the support 15 for this purpose. The blocks 19, in such case, rest at the bottom of the guideways 20 to maintain the axis of the roll 17 in a relatively fixed position while the blocks 18 are freely movable in an upward direction in said guideways 20 whereby the roll 16 may adjust itself relatively to the roll 17 to accommodate piles of material of different vertical thickness as will appear more fully hereinafter. It will be understood that suitable means of any well known construction and arrangement may be included to increase the degree of pressure exerted by the roll 16 if the dead weight of the latter is insufficient to provide the required pressure.

The rolls 16 and 17 are geared together by means of gears 21 and 22, the roll 17 in addition being provided with a gear 23 which meshes with a pinion 24 mounted upon a counter-shaft 25 journalled on the frame 15 as shown in Fig. 1. Any suitable means capable of causing a periodical reversal in the direction of rotation of the rolls 16 and 17 may be utilized as a driving means therefor; the illustrated example shows said driving means in the form of an electric motor 26 which carries a pinion 27 in mesh with a gear 28 located upon the counter shaft 25.

A table 29 or equivalent device is mounted upon the frame 15 to one side of the rolls 16 and 17 and terminates at one end in close proximity thereto as shown in Fig. 2, said table being preferably provided upon its upper face with a plurality of parallel metal strips 29ª secured in position in any convenient manner and serving to reduce wear upon the table itself and to decrease friction as will be apparent. A pair of spaced and parallel members 30 preferably in the form of angle irons are located upon the other side of said rolls 16 and 17 and have one of their ends located in juxtaposition to the periphery of the roll 17 as shown in Fig. 2, the members 30 at this end being supported upon a cross-bar 31 secured upon the frame 15. The opposite ends of said members 30, in the illustrated example, are secured to brackets 32 fastened upon a suitable support which as shown may be constructed in the form of a transverse table 33. A plurality of rollers 34 are rotatably mounted at spaced intervals upon the upright flanges of the angle irons 30 on the inside thereof for the purpose to be more clearly set forth hereinafter. The table or equivalent device 29 and the parallel members 30 constitute a supporting means upon which the piles of material to be plated are adapted to travel, the members 30 themselves constituting a runway leading to said pressing rolls 16 and 17.

At equal distances on opposite sides of the pressing rolls 16 and 17 are located reversing devices which control the driving means and which, in the illustrated example, are in the nature of electric switches 35 and 36 in electrical circuit with the motor 26 and arranged to periodically reverse the direction of the motor and consequently of the rolls 16 and 17. It will be understood that the arrangement is such that the switches are alternately operated in harmony to bring about the desired results and with this object in view may be of any suitable construction.

The switch 35 is located to the left of the rolls 16 and 17 in Figs. 1 and 2 upon the table 29 and is operated by means of a push-member 37 provided upon its active face with an insulating pad 38 and yieldingly mounted upon an arm 39 as shown in Fig. 7; a coil spring 40 is combined with the arm and push member in such a manner that the latter will be maintained in and returned to its normal position. The arm 39 is carried by a plunger 41 slidably mounted in a bracket 42 which is secured upon the table 29 in any convenient manner as by means of a bolt and nut 43; a coil spring 44 surrounds said plunger 41 between one member of the bracket 42 and a collar 45 fixed upon said plunger and serves to maintain the latter in its normal position and to return it thereto. A pad or cushion 46 of suitable material which may be in the nature of an electric insulator is fastened upon the arm 39 preferably in registry with the plunger 41, it being understood that the pad 46 and preferably also the plunger 41 are in the path of the pile being operated upon.

The switch 36 is located to the right of the rolls 16 and 17 in Figs. 1 and 2 upon a block or its equivalent 47 and is operated also by a push-member 48 (Fig. 5) provided upon its active surface with an insulating pad 49 and yieldingly mounted upon an arm 50 under the influence of a coil spring 51 in the same way as the push-member 37 previously described. The arm 50 is carried by a plunger 52 which, like the plunger 41 is slidably mounted in a bracket 53 secured upon the block 47 and is likewise controlled by a coil spring 54 located between a member of the bracket 53 and a collar 55 fixed upon said plunger. A pad or cushion 56, which may be a duplicate of the pad 46 is secured upon the arm 50 preferably in registry with the plunger 52 as shown in Figs. 4 and 5.

The block or its equivalent 47 is located between the parallel members 30 and is carried by arms 57 pivotally connected at 58 with the frame 15, the arrangement being such that the block 47 and the arms 57 together constitute a frame capable of swinging movements in a vertical plane on the pivots 58 for the purpose to be more fully set forth hereinafter.

In the operative condition of the parts the said frame occupies a raised position as shown in Fig. 4 in which the pad 46 and plunger 52 are located in the path of the pile which is being plated. Any suitable device may be utilized to maintain said frame in this raised position, the only requirement being that said device must be capable of being operated to bring about or permit a downward swinging movement of the frame at the proper time. Thus the means shown in the drawings may be utilized for this purpose, said means comprising a toggle consisting of links 59 and 60 pivotally connected at 61, the link 59 being pivoted at 62 to block 47 and the link 60 being pivoted at 63 to a lug 64 as shown in Figs. 4 and 5. This toggle is capable of being broken only in one direction and for this reason the link 60 is formed with a projection 65 which engages a pin 66 carried by the link 59, the co-operation of the projection 65 and pin 66 arresting the straightening out of the toggle and preventing breaking thereof in one direction.

The means whereby the toggle is broken at the proper time is illustrated in a specific form in the drawings without intending to indicate that this is the only means whereby the results sought for may be attained. As shown, said means comprises a rod 67 slidable in the direction of its length in a slotted tube 68 rigidly secured upon a bracket 69 which depends from the block or its equivalent 47. A coil spring 70 surrounds said rod 67 and has its one end in engagement with the free end of the tube 68 and its other end abutting against a washer or the like 71 fixed upon said rod; the spring 70 serves to maintain the latter in its normal position and to return it thereto as shown in Fig. 5. The rod 67 is provided with a toothed rack 72 which projects through the slot of the tube 68 and is engaged by a spring pressed stop pawl 73 pivotally mounted upon the bracket 69 and whereby lengthwise movement of said rod relatively to the tube 68 in a return direction under the action of the spring 70 is prevented. The forward or feed movement of the rod, which is a step by step movement, is brought about by means of a spring pressed feed pawl 74 pivotally connected with one end of a lever 75 which itself is pivoted at 76 upon a lug 77 projecting from the bracket 69 as shown in Figs. 4 and 5. The opposite end of the lever 75 is connected by means of a link 78 with the plunger 52, thus operatively connecting the one reversing mechanism with the togglebreaking means. The operative end of the rod 67 is arranged to engage an abutment 79 adjustably mounted upon the toggle-link 59 in any suitable manner as for instance by providing the abutment with a slot 80 for the accommodation of a set screw 81 whereby said abutment is fixed in position; by changing the position of said abutment, or in other words by moving it towards or away from the operative end of the rod 67 when the latter is in its position of rest, the breaking of the toggle may be timed in accordance with the predetermined number of times it is desired to pass the pile between the pressure rolls 16 and 17. An upright member 82 is located in a position to be engaged by pins 83 and 84 mounted respectively upon the pawls 73 and 74 and is of a height sufficient to lift said pawls from engagement with the rack 72 when the parts move to the position shown in Fig. 5, whereby the rod 67 is free to be returned to its normal position by the action of the spring 70.

In the illustrated example the specific means whereby the toggle may be restored or straightened out to return the parts to the position shown in Fig. 4 comprises a yoke 85 journalled in bearings 86 and provided with an operating lever 87. For the purpose of avoiding shocks and strains it is desirable to provide a dash pot arrangement consisting of a cylinder 88 pivoted at 89 upon stationary lugs 90 and a piston 91 reciprocable in said cylinder 88 and carried by a piston rod 92 which may be pivotally connected at 93 with one of the arms 57; with this arrangement the downward pivotal movement of the one reversing mechanism and its co-related parts is yieldingly resisted so that said movement is gradual and not abrupt.

In carrying out the plating operation it is desirable, after the pile has been passed back and forth between the rolls 16 and 17 a certain number of times, to turn the pile through an arc of one hundred and eighty degrees and then to repeat the rolling process. This is done for the purpose of insuring a perfect and uniform plating of the pile and to avoid the possibility of producing an uneven finish; the turning of the pile, while desirable, may therefore be dispensed with in some instances. To facilitate turning the pile as indicated, a turn table 94 may be provided at a suitable point between the members 30, said table, in the illustrated example, being carried by a stem 95 which is rotatably mounted in a socket member 96 as shown in Figs. 4 and 5. Normally the turntable 94 occupies an inoperative position somewhat below the path traversed by the pile during the plating operation so that it becomes necessary to lift said table to an operative position when it is desired to turn the pile, the extent of upward movement being sufficient to raise said table above the rollers 34 in order that the pile may clear the same throughout the turning movement. For this purpose the socket member 96 is vertically slidable in a tubular guide 97 which is carried respectively by a cross-bar 98 secured to the members 30 and suitable braces 99 which in addition serve to stiffen the construction. Any convenient mechanism may be utilized to elevate said turntable; for instance, as shown in the illustrated example, the lower end of the socket member 96 may be forked for the accommodation of a lever 100 as shown in Fig. 5. The lever 100 is pivoted at 101 upon a stationary upright 102 at one end and at its other end is pivotally connected at 103 with a link 104 which itself is pivoted at 105 to a lever 106; the latter is fulcrumed at 107 upon a fixed lug 108 and terminates at its free end in a foot-treadle 109.

The machine includes further a carriage 110 constructed in the form of a frame mounted on wheels 111 arranged to be reciprocated upon tracks 112 which are secured upon the transverse table 33 so as to extend transversely to the parallel members 30 as shown in Fig. 1. The carriage 110 includes cross-pieces 113 and 114 upon which a plurality of rollers 115 and 116 are mounted in spaced relation and so as to project upwardly beyond said cross-pieces 113 and 114 as illustrated in Fig. 3. The cross-pieces 113 and 114 are spaced apart to correspond to the distance between the members 30 and are positioned at a corresponding level, the movements of the carriage being such as to alternately bring the cross-pieces 113 and 114 into registry with said members 30. Suitable stops 117 and 118 are provided at opposite ends of the track 112 for the purpose of arresting the movements of said carriage 110 when the cross-pieces 113 and 114 respectively are in proper registry with the members 30; the stop 117 may be in the nature of an upright enclosure extending across the end and along one side of the track 112 as shown in Fig. 1, said enclosure in such case preferably projecting somewhat above the carriage 110 as illustrated in Fig. 3.

The sets of rolls 115 and 116 constitute duplicate tables or supports for piles of alternate steel plates and printed sheets as will be more fully described hereinafter.

The transverse table 33 is provided at one end with a platform 119 for convenience of operation and at an intermediate point with a receptacle 120 for the reception of the finished product. The receptacle 120 as shown may be hinged to the table 33 so as to be capable of being dropped to an inoperative position, a foldable leg or the like 121 being in such case provided for maintaining said receptacle in its operative position. Friction rollers 122 may be located upon the table 33 in registry with the receptacle 120 for facilitating the transfer of the finished product thereto.

At the beginning, for instance of a day's operations, the carriage 110 may be moved, by means of a suitable handle 123 provided for the purpose, along the tracks 112 to the position shown in Fig. 1 in which the support formed by the cross-pieces 114 and the rollers 116 register with the members 30, while the support composed of the cross-pieces 113 and rollers 115 lies within the stop enclosure 117 and in close proximity to the platform 119, the carriage 110 engaging said stop 117 as shown in Fig. 1. The platform 119 affords a convenient resting place for the sheets of paper 124 to be plated and supports the same within easy reach of the operator who, at the beginning of the operation, builds up a pile $a$ of alternating sheets of paper 124 and sheets of steel 125 upon the rollers 115, it being understood that the steel sheets 125 are of suitable dimensions to properly support the pile upon said rollers 115. After a pile $a$ of the desired size has been built up as described the carriage 110 is shifted upon the tracks 112 to a position in which the cross-pieces 113 are in registry with the parallel members 30 and said pile $a$ is manually transferred or rolled from the rollers 115 to the roller 34 of the runway 30 and moved along the latter up to the pressing rolls 16 and 17. As soon as the pile $a$ has been removed from the rollers 115 the carriage 110 is moved back to the position shown in Fig. 1, the operator immediately beginning to build up a second pile $b$ upon said rollers 115, similar to the pile $a$. It will be understood that the switch 36 and its correlated parts occupy the inoperative position shown in Fig. 5 to permit the passage of the pile $a$ along the rollers 34 and that said switch and parts are raised by the operator to the position shown in Fig. 4 when the pile $a$ has travelled beyond the same toward the rolls 16 and 17. At this stage the latter are rotating in a direction to cause the pile $a$ to pass between said rolls 16 and 17 toward the left in Fig. 1. The travel of the pile $a$ in this direction continues until said pile contacts with the pad 46 and thus pushes the plunger 41 against the tension of the spring 44 and thereby causes the push-member 37 to actuate the switch 35, it being understood that the arrangement is such that the switch 36 is coincidently rendered inactive as a circuit closing medium. As soon as the switch 35 has been operated as described the direction of rotation of the motor 26 and consequently of the pressure rolls 16 and 17 is reversed so that the pile $a$ is now caused to travel between said rolls toward the right in Fig. 1. This continues until the pile $a$ strikes against the pad 56 and thus operates the plunger 52 against the tension of the spring 54 and thereby causes the push-member 48 to actuate the switch 26, the opposite switch 35 being at the same time rendered inactive. When the actuation of the switch 36 occurs, the direction of rotation of the motor 26 and of the rolls 16 and 17 is again reversed whereby the pile $a$ is again passed between said rolls toward the left in Fig. 1 until it again engages the pad 46 to actuate the switch 35 and again reverse the direction of travel of the pile $a$.

It will be understood that the pads 46 and 56 may be located so as to be engaged and shifted by the pile $a$ to bring about a reversal of the travel thereof before said pile has passed entirely from between said rolls; the latter may therefore maintain a feeding grip upon said pile $a$ whereby the feed between the rolls in opposite directions is brought about without any manual assistance. Or, as is the case in the illustrated example, the pile $a$ as it engages the pads 46 and 56 and compresses the springs 44 and 54 finally passes out of engagement with said rolls 16 and 17 and, after the latter have been reversed, is given an impetus by the action of said springs in resuming their normal conditions, whereby said pile $a$ is again brought into operative engagement with said rolls.

Each time the plunger 52 is moved against the tension of its spring 54 because of the impact of the pile, the link 78 causes the lever 75 to rock on its pivot 76 whereby, through the co-operation of the feed-pawl 74 with the rack 72, the rod 67 is moved one step toward the left in Fig. 4 and held in this position by the stop-pawl 73. This continues until finally the rod 67 engages the adjustable abutment 79 on the toggle-link 59 and by exerting a pushing force thereon finally causes the links 59 and 60 to fold thus collapsing or breaking the toggle as shown in Fig. 5. By properly adjusting the abutment 79 this breaking of said toggle is caused to take place after the pile has been passed between the pressing rolls 16 and 17 the desired or predetermined number of times, the action being entirely automatic.

The described breaking of the toggle causes the arms 57 and block 47 to swing downwardly on the pivots 58 whereby the switch 36 and the mechanism for operating the same is carried downwardly below the rollers 34 and out of the path of the pile a as shown in Fig. 5. This dropping of the parts brings the pins 83 and 84 into contact with the upright member 82 and thereby causes the pawls 73 and 74 to be lifted out of engagement with the rack 72 as shown in Fig. 5. This releases the rod 67 which is immediately restored to its normal position by the action of the spring 70. It will be understood that before the inertia of the rolls 16 and 17 has been overcome and the direction of rotation thereof reversed by the actuation of the switch 36 just prior to the described dropping of the parts, the action of said rolls will move the pile a to the right in Fig. 4 a distance sufficient to completely free said pile from said rolls. This movement of said pile is possible because the pad 56 is no longer in its path of travel. Thus as soon as the switch 36 and its co-related elements have been moved downwardly out of the way the pile a may be manually rolled into registry with and over the turn-table 94 which is then elevated by depressing the pedal 109 to raise said pile above the rollers 34 to the position illustrated in Fig. 5. The pile a is then rotated through an arc of one hundred and eighty degrees to reverse its ends after which the turn-table 94 is lowered and the pile deposited upon the rollers 34 in its new position and again passed back and forth between the pressing rolls 16 and 17, it being understood that the toggle is restored at the proper time by operating the yoke 85 through the medium of the operating lever 87. During this second reciprocation of the pile a between said rolls the direction of travel is reversed through the alternate operation of the switches 35 and 36 in the same way as hereinbefore described. Similarly, after the pile a has been passed back and forth between the rollers 16 and 17 the desired number of times the toggle links 59 and 60 will be actuated to break the toggle by means of the rod 67 in the same way as previously set forth, thus again dropping the switch 36 and its co-operating parts out of the path of the pile a to the position shown in Fig. 5.

This particular pile a having been plated, it is manually rolled upon the rollers 34 of the runway 30 toward the rollers 116, which have remained in a position of registry with the rollers 34 during the plating of said pile a and is deposited upon said rollers 116. The carriage 110 is now shifted along the tracks 112 to a position in which the cross-pieces 113 again register with the members 30 and the second pile b which has meanwhile been built up on the rollers 115 is transferred to the rollers 34 and along the runway 30 to the pressing rolls 16 and 17 and is subjected to the plating operation by being passed backward and forward between the same in the same manner as previously described with respect to the pile a; the operations of all the parts, during the treatment of the pile b are repetitions of those hereinbefore mentioned.

As soon as the pile b has been transferred from the rollers 115 to the rollers 34, the carriage 110 is shifted back along the tracks 112 to the position shown in Fig. 9. During the time the pile b is being plated, the operator coincidently dismantles the pile a and builds up a third pile c upon the rollers 115; in doing this the plated sheets of paper from the pile a are transferred over the friction rollers 122 to the receptacle 120 and the metal sheets from said pile a are placed upon the rollers 115 in alternate arrangement with unplated sheets of paper 124 from the platform 119. Thus by the time the pile b has been plated in the predetermined manner, the rollers 116 will be free to receive the same as indicated in Fig. 10. As soon as the pile b has been transferred to said rollers 116 the table 110 is moved to the position shown in Fig. 11 and the pile c is shifted from the rollers 115 to the rollers 34 and passed between the pressing rolls 16 and 17 a predetermined number of times in the same way as previously set forth. Subsequent to the transfer of the pile c from the rollers 115 the carriage 110 is moved back to the position indicated in Fig. 9 and the pile b is dismantled by passing the paper sheets to the receptacle 120 and by utilizing the steel sheets in the building of a fourth pile upon the rollers 114 in the same way as previously mentioned. This sequence is repeated throughout any given operation of the machine so that while one pile is being plated, a previously plated pile is being dismantled and a new unplated pile is being built up; the operation of the machine is therefore substantially continuous and without any idle operative periods of any consequence.

The machine is simple in construction and efficient in operation, the plating being carried on automatically without any special attention on the part of the operator beyond that required to turn the pile through an arc of 180° at the proper time and to manually shift the same to the carriage 110 at the end of the plating operation. The mechanical arrangements in the machine are such that the materials and more particularly the piles are handled and manipulated with a minimum of effort.

Various changes in the specific form shown and described may be made within the scope of the claims without departing from the spirit of the invention.

I claim:

1. A plating machine comprising supporting means upon which a pile of material to be plated is adapted to travel, pressing rolls in operative co-relation to said supporting means and operatively connected with each other, said pile being reciprocated between said rolls, driving means whereby said rolls are driven and devices located upon opposite sides of said rolls for controlling said driving means and arranged to be alternately actuated by said pile to reverse the driving means and rolls, whereby the direction of travel of said pile is automatically reversed.

2. A plating machine comprising supporting means upon which a pile of material to be plated is adapted to travel, pressing rolls in operative co-relation to said supporting means and operatively connected with each other, said pile being reciprocated between said rolls, driving means whereby said rolls are driven, devices located upon opposite sides of said rolls for controlling said driving means and arranged to be alternately actuated by said pile to reverse the driving means and rolls whereby the direction of travel of said pile is automatically reversed and tripping means operated by one of said devices whereby the latter is moved to an inoperative position after a predetermined number of reciprocations of said pile to permit it to pass completely from between said rolls.

3. A plating machine comprising supporting means upon which a pile of material to be plated is adapted to travel, pressing rolls in operative co-relation to said supporting means and operatively connected with each other, said pile being reciprocated between said rolls, driving means whereby said rolls are driven, devices located upon opposite sides of said rolls in the path of said pile and controlling said driving means, said devices being alternately actuated by said pile to reverse the driving means and rolls whereby the direction of travel of said pile is automatically reversed, a pivoted support carrying one of said devices and tripping means operated by the last named device whereby said pivoted support is swung to an inoperative position to remove said last named device from the path of said pile after a predetermined number of reciprocations thereof.

4. A plating machine comprising supporting means upon which a pile of material to be plated is adapted to travel, pressing rolls in operative co-relation to said supporting means and operatively connected with each other, said pile being reciprocated between said rolls, driving means whereby said rolls are driven, devices located upon opposite sides of said rolls in the path of said pile and controlling said driving means, said devices being alternately actuated by said pile to reverse the driving means and rolls whereby the direction of travel of said pile is automatically reversed, a pivoted support carrying one of said devices, a toggle whereby said pivoted support is maintained in its operative position, a slidable rod carried by said support and means connected with the last named device whereby said rod is advanced step by step to finally break said toggle after a predetermined number of reciprocations of said pile and swing said support to an inoperative position in which said last named device is out of the path of said pile.

5. A plating machine comprising supporting means upon which a pile of material to be plated is adapted to travel, pressing rolls in operative co-relation to said supporting means and operatively connected with each other, said pile being reciprocated between said rolls, driving means whereby said rolls are driven, devices located upon opposite sides of said rolls in the path of said pile and controlling said driving means, said devices being alternately actuated by said pile to reverse the driving means and rolls whereby the direction of travel of said pile is automatically reversed, a pivoted support carrying one of said devices, a toggle whereby said pivoted support is maintained in its operative position, a slidable rod carried by said support, a toothed rack on said rod, a spring for restoring said rod to its normal position, an abutment adjustably mounted on said toggle, a lever pivoted on said support, a link connecting said lever with said last named device, a feed pawl carried by said lever and engaging said rack to advance said rod step by step in concurrence with the actuation of said last named device and into engagement with said abutment whereby said toggle is finally broken after a predetermined number of reciprocations of said pile to swing said support to an inoperative position in which said last named device is out of the path of said pile, a stop pawl cooperating with said rack to prevent a return movement of said rod and a member adapted to disengage said pawls from said rack as said support is swung to its inoperative position whereby said rod is returned to normal position by its spring.

6. A plating machine comprising a pair of pressure rolls between which a pile of alternate metal sheets and paper sheets is reciprocated, a runway upon which said pile is led to said rolls, a turntable normally located below said runway and means for elevating said turntable to lift said pile from said runway and to rotate it through an arc of 180°.

7. A plating machine comprising supporting means upon which a pile of material to be plated is adapted to travel, pressing rolls in operative co-relation to said supporting means and operatively connected with each other, said pile being reciprocated between said rolls, driving means whereby said rolls are driven, devices located upon opposite sides of said rolls for controlling said driving means and arranged to be alternately actuated by said pile to reverse said driving means and rolls whereby the direction of travel of said pile is automatically reversed, a turntable normally located below said supporting means and means including a foot treadle for elevating said turntable to lift said pile from said supporting means and rotate it through an arc of 180° for further reciprocation between said rolls.

8. A plating machine comprising a pair of plating rolls operatively connected together, driving means for driving said rolls, a runway leading to said rolls upon which a pile of alternate sheets of metal and sheets of paper is conducted thereto, said pile being reciprocated between said rolls, devices located upon sides of said rolls for controlling said driving means and adapted to be alternately actuated by said pile to reverse the driving means and rolls whereby the direction of travel of said pile is automatically reversed, a tripping device operated by one of said devices whereby the latter is moved to an inoperative position after a predetermined number of reciprocations of said pile to permit a return thereof along said runway, a track extending transversely of said runway, a carriage arranged to be reciprocated on said track, and a plurality of supports on said carriage adapted to be each moved into registry with said runway to deliver piles of material thereto and to receive piles therefrom.

9. A plating machine comprising a pair of plating rolls between which a pile of material to be plated is reciprocated, a runway leading to said rolls upon which said pile is conducted thereto, a track extending transversely of said runway, a carriage adapted to be reciprocated thereon, and a plurality of supports on said carriage adapted to be each moved into registry with said runway to deliver piles of material thereto and to receive piles therefrom.

10. A plating machine comprising a pair of plating rolls between which a pile of alternate metal sheets and paper sheets is reciprocated, a runway leading to said rolls upon which said pile is conducted thereto, a track extending transversely to said runway, a platform at one end of said track for a supply of paper sheets, a carriage adapted to be reciprocated upon said track and a plurality of supports on said carriage adapted to be each moved into registry with said runway to deliver piles of material thereto and to receive piles therefrom, the distance between said supports being such that one support will register with said runway when another support is in juxtaposition to said platform whereby one pile may be plated coincidentally with the dismantling of the last previously plated pile and the building up of the next succeeding pile to be plated.

11. A plating machine comprising pressing rolls, driving means whereby said rolls are driven, and devices for controlling said driving means arranged to be alternately actuated to reverse the rolls, whereby the work will be passed back and forth between the rolls, a part of the controlling devices being arranged to be rendered inoperative after a predetermined number of reciprocations of the work.

12. A plating machine comprising pressing rolls, driving means whereby said rolls are driven in opposite directions, devices located upon opposite sides of said rolls for controlling the driving means and arranged to be alternately actuated by the work to reverse the direction of rotation of the rolls, and tripping means whereby a controlling device on one side of the rolls is moved from its usual operative position after a predetermined number of reversals of the directions of rotation of the rolls.

ALICE HOOD COHEN.
*Executrix of Stanley A. Cohen, deceased.*